Dec. 15, 1936.   N. D. HATHAWAY   2,064,428
FISHLINE SUPPORTING AND REELING DEVICE
Filed Jan. 18, 1936
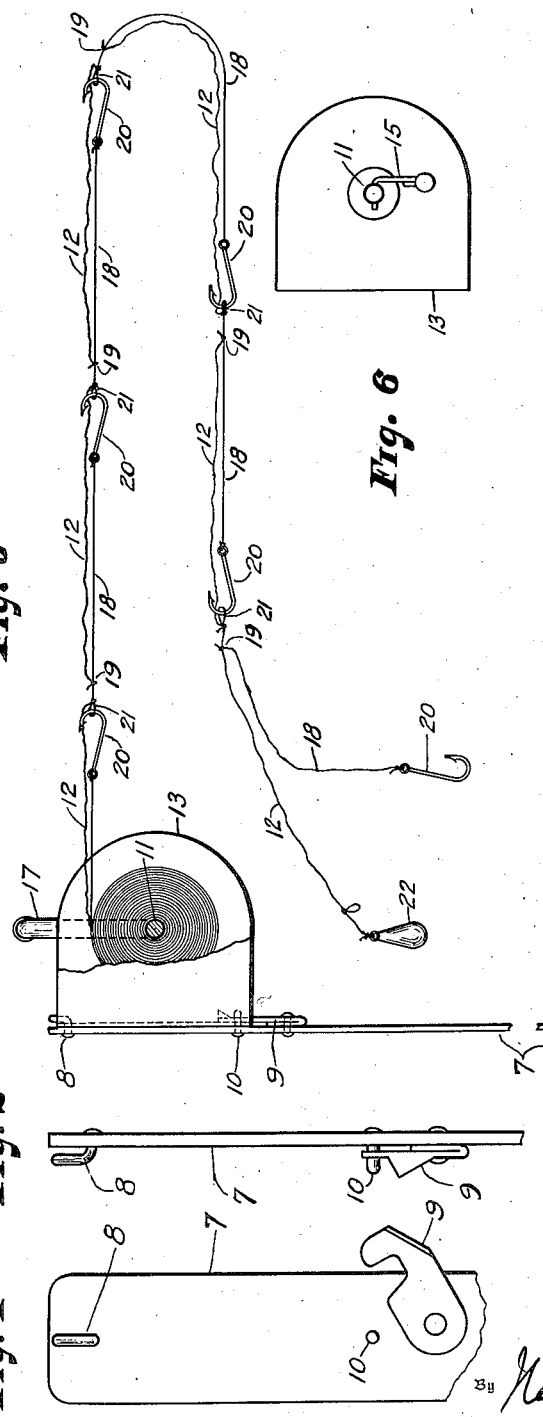
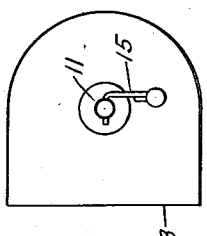
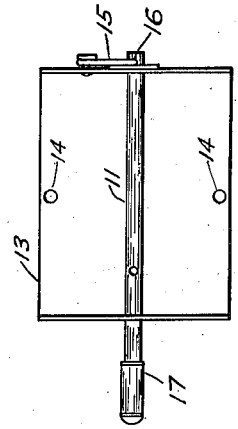
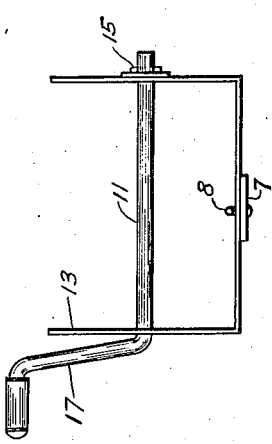
N. D. HATHAWAY
Inventor Patented Dec. 15, 1936

2,064,428

UNITED STATES PATENT OFFICE 2,064,428

FISHLINE SUPPORTING AND REELING DEVICE

Noland D. Hathaway, Omaha, Nebr.

Application January 18, 1936, Serial No. 59,703

1 Claim. (Cl. 43—15)

This invention relates to a fishline supporting and reeling device arranged for still fishing.

It is well known that posts have heretofore been provided with line-supporting reels, and that the fishlines have been provided with hook-bearing leaders, the posts being driven into the ground or otherwise supported along the banks of a stream while fishing.

Devices of this kind heretofore produced have not been convenient in use, and therefore the object, broadly, of the present invention is to provide certain improvements relating to convenience and durability for operation.

The invention includes a post which is detachable from the reel-frame, a reel interchangeable from the "right" to the "left" side for winding the fishline, a new mounting for the leaders of the fishline so that the hooks will not become entangled while reeling or unreeling the fishline, rotation-control for the reel, and other details which it is believed will be appreciated by fishermen.

The invention consists of the new and useful construction, combination and arrangement of parts as described herein and claimed, and as shown in the accompanying drawing, it being understood that changes may be made in form, size, proportion of parts and minor details, said changes being within the scope of the invention as claimed.

In the drawing, Fig. 1 is a rear side view showing a part of a post, and Fig. 2 is an edgewise view of the same.

Fig. 3 is a side view of the device, the vertical post and reel-frame being broken away, and showing a plurality of leaders with hooks engaging in loops of the fishline.

Fig. 4 is a plan view of the reel-frame and post.

Fig. 5 is a view of the inner side of the frame shown in Fig. 4.

Fig. 6 is a side view of the reel-frame.

Referring now to the drawing for a more particular description, numeral 7 indicates a standard or post adapted to be driven into the ground, said post being provided near its upper end on its rear side with an upwardly projecting hook 8, and also provided with a pivotally mounted latch-hook 9, and an outwardly extending head-pin or projection 10, operating as a staple.

Numeral 11 indicates the rotatable shaft or spool on which a fishline 12 may be wound.

Numeral 13 indicates a reel-frame approximately of U-shape in plan, in the arms of which the shaft or spool has bearings.

Numerals 14 indicate a pair of apertures which are formed in the main body of the U-shaped frame, said apertures being disposed at uniform distances from the edges, equi-distant from the ends of said body.

On account of the construction as described the frame 13 is detachable from the post, this being a matter of convenience as a portable feature, and the parts may be readily assembled.

When assembling these parts, the frame 13 is disposed on the inner side of the post, its apertures 14 receiving the hook 8 and head-pin 10, and the latch-hook 9 engaging the head-pin 10. For detaching the frame 13 from the post, all that is necessary is to swing the latch-hook from its engagement with the pin 10 which releases the lower edge of the body of the frame from the post, and a swinging movement of the frame relative to the post will permit removal of said frame relative to the post.

To control the rotation of the shaft or spool 11, a second latch-hook is provided as indicated at 15, this hook being pivotally mounted on one of the wings of the U-shaped frame and adapted to engage in an aperture 16 which is formed in the shaft 11.

The line 12 may be reeled on the spool 11 by using the crank 17, subject to the control of the hook 15.

Numerals 18 indicate leaders, each secured at one end as indicated at 19 to the fishline 12, the hooks for the leaders being indicated at 20.

Numerals 21 indicate loops which are provided for the fishline 12, and at 22 is indicated a sinker for said line.

It will be understood that the leaders may be secured to the line 12 at intervals thereof, and suitably spaced apart and that any suitable number of leaders may be used, subject to regulation of law, and it will be seen that the length of each leader is less than the length of that part of the line 12 between a loop 21 engaged by a hook 20 and the tie or knot 19 which secures one end of the leader to said line 12, and since the leaders, on account of this construction, will remain in a stretched or taut condition they will not become entangled during the operation of reeling, and also, during operation, if it is desired that only a limited number of the leaders be used, the excess or unused leaders may remain in a taut condition with their hooks engaging in said loops.

I claim as my invention:—

In a fishline reeling device, a rotatable spool, a fishline carried by the spool and provided at longitudinal intervals with loops, and a plurality of leaders each joined at one end to the fishline and having the opposite end provided with a hook adapted to engage a loop, each leader having a lesser length than that part of the fishline between said engaged loop and the junction therewith of said leader.

NOLAND D. HATHAWAY.